United States Patent [19]

Grabe

[11] Patent Number: 4,861,392
[45] Date of Patent: Aug. 29, 1989

[54] WELDING AID

[75] Inventor: Richard J. Grabe, Pretoria, South Africa

[73] Assignee: Evelyn A. Grabe, South Africa

[21] Appl. No.: 206,435

[22] Filed: Jun. 14, 1988

[51] Int. Cl.$^4$ .............................................. B23K 35/34
[52] U.S. Cl. ........................................ 148/23; 148/24
[58] Field of Search ................................... 148/23, 24

[56] References Cited

U.S. PATENT DOCUMENTS

| | | | |
|---|---|---|---|
| 1,556,968 | 10/1925 | Smith | 148/23 |
| 2,139,522 | 12/1938 | Shepherd | 148/24 |
| 2,695,943 | 11/1954 | Cape | 148/24 |
| 3,235,405 | 2/1966 | Quaas | 148/24 |
| 3,838,246 | 9/1974 | Asnis | 148/24 |

Primary Examiner—Peter D. Rosenberg
Attorney, Agent, or Firm—Wood,Dalton,Phillips Mason & Rowe

[57] ABSTRACT

A welding aid includes a particular carbon-based weld spatter adhesion inhibitor, and a particulate calcium-based adjuvant mixed with the inhibitor. The mixture is capable of being applied to a metal surface to be welded, thereby to inhibit adhesion of weld spatters to the metal surface on welding of the metal surface.

13 Claims, No Drawings

WELDING AID

FIELD OF THE INVENTION

This invention relates to a welding aid.

SUMMARY OF THE INVENTION

According to the invention there is provided a welding aid which includes a particulate carbon-based weld spatter adhesion inhibitor; and a particulate calcium-based adjuvant mixed with the inhibitor, the mixture being capable of being applied to a metal surface, thereby to inhibit adhesion of weld spatters to the metal surface.

In use, the welding aid can, e.g. be applied to a metal surface which is to be welded, e.g. by means of arc welding. Weld spatters, ie droplets of molten metal formed during welding and which normally adhere to the metal at or alongside the zone of welding, come into contact with the applied composition, and hence do not readily adhere to the metal.

The mass ratio of inhibitor to adjuvant may be between 1 to 5 and 1 to 15 e.g. between 1 to 8 and 1 to 12.

The aid may include sufficient liquid carrier so that it has the consistency of a viscous fluid or a paste. The liquid carrier may, in particular, be water and may be soft water, ie water free of calcium and magnesium salts. The mass ratio inhibitor to water may be between 1 to 4 and 1 to 10 e.g. between 1 to 5 and 1 to 8.

The inhibitor may be graphite, e.g. micronized or powdered graphite.

The adjuvant may comprise lime stone, e.g. lime stone dust or powder. The lime stone dust particles may be less than 1000 mesh.

The aid may also include in the mixture at least one anti-oxidant and/or a fungicide. The anti-oxidant may be a heterocyclic compound, which may be a six-membered heterocyclic compound. It may be morpholine. The mass ratio of morpholine to inhibitor may be between 1 to 4 and 1 to 15 e.g. between 1 to 5 and 1 to 12.

The aid may also include at least one emulsifier in the mixture. The emulsifier may comprise a sorbitan mono-oleat, e.g. polyoxyethylene (20) sorbitan mono-oleat. The mass ratio of emulsifier to inhibitor may be between 1 to 10 and 1 to 40, e.g. between 1 to 12 and 1 to 30.

The aid may further include at least one suspension agent in the mixture. The suspension agent may comprise an alginic acid salt, a cellulose derivative, a polysaccharide, or mixtures thereof. When the alginic acid salt is present, it may be the sodium or potassium salt of alginic acid. The cellulose derivative, when present, may be that available locally under the trade name NATRASOL e.g. NATRASOL LR70. The polysaccharide, when present, may be a xanthan gum such as that available locally under the trade name KELZAN. The mass ratio of suspension agent to inhibitor may be between 1 to 1 and 1 to 150, e.g. between 1 to 1,2 and 1 to 125 by mass.

The welding aid may comprise

| | |
|---|---|
| limestone dust | 51-60% (by mass) |
| micronized graphite | 5-6% (by mass) |
| soft water | 34-38% (by mass) |
| morpholine | 0.5-1% (by mass) |
| polyoxethylene (20) sorbitan mono-oleat | 0,2-0,4% (by mass) |
| potassium alginate | 0,2-1,0% (by mass) |
| NATRASOL LR70 | 0,02-1,2% (by mass) |
| KELZAN | 0,01-1,0% (by mass) |

The aid may still further include a colouring agent in the mixture. The colouring agent may be a metal oxide, such as red iron oxide. The red iron oxide may be present in the composition in a proportion of between 2% and 5% by mass.

DESCRIPTION OF THE PREFERRED EMBODIMENT

The invention will now be described with reference to the following non-limiting examples:

EXAMPLE 1

A welding aid in accordance with one embodiment of the present invention, has the following components or composition:

| Component | Parts by Mass | % by Mass |
|---|---|---|
| limestone dust 1000 mesh | 75,00 | 29,20 |
| limestone dust 1400 mesh | 75,00 | 29,20 |
| micronized graphite | 14,00 | 5,40 |
| soft water | 90,00 | 35,02 |
| morpholine | 2,10 | 0,82 |
| polyoxyethylene (20) sorbitan mono-oleate | 0,80 | 0,32 |
| potassium alginate | 0,05 | 0,02 |
| NATRASOL LR70 | 0,05 | 0,02. |
| KELZAN | 0,3 | 0,01 |

The composition can be formed by mechanically admixing the components, and has the consistency of a viscous solution or a paste. It can then be applied to a surface which is to be arc welded, e.g. by means of a brush. In use, the composition thus applied will act as an anti-spatter barrier and also serves as fluxing compound during welding. Spatters formed during the welding process will come into contact with the anti-spatter barrier and will not readily adhere to the metal. Hence, the spatters can subsequently easily be removed, e.g. by merely brushing them from the welded surface.

The Applicant believes that this will lead to substantial savings in welding time since it will not be necessary to chip or grind off the spatters which normally adhere to the metal.

EXAMPLE 2

A spatter-proofing welding aid in accordance with another embodiment of the invention has the following composition:

| Component | Parts by Mass | % by Mass |
|---|---|---|
| limestone dust 1000 mesh | 75,00 | 27,06 |
| limestone dust 1400 mesh | 75,00 | 27,06 |
| micronized graphite | 14,00 | 5,05 |
| soft water | 100,00 | 36,08 |
| morpholine | 2,10 | 0,76 |
| polyoxyethylene (20) sorbitan mono-oleate | 0,80 | 0,29 |
| potassium alginate | 0,05 | 0,02 |
| NATRASOL LR70 | 0,20 | 0,07 |
| red iron oxide | 10,00 | 3,61 |
| KELZAN | 0,01 | 0,01. |

Again the components are admixed or intermingled mechanically to give a composition having the consistency of a viscous fluid or paste.

The Applicant believes that the aid of Example 2 will be particularly suitable for applying to a jig for holding articles to be welded. Hence, it will prevent or inhibit adherence of weld spatters to the jig when the articles are welded. The red iron oxide colouring is added to render the aid visually distinctive.

What is claimed is:

1. A welding aid, which welding aid includes:
    a particulate carbon-based weld spatter adhesion inhibitor;
    a particulate calcium-based adjuvant mixed with the inhibitor; and
    a liquid carrier for the adhesion inhibitor and the adjuvant,
    whereby the mixture is capable of being applied to a metal surface, thereby to inhibit adhesion of weld spatters to the metal surface.

2. An aid according to claim 1, wherein the liquid carrier is soft water that is substantially free of calcium and magnesium salts, there being sufficient soft water present so that the aid has a viscous consistency.

3. An aid according to claim 2, wherein the inhibitor is graphite.

4. An aid according to claim 2, wherein the adjuvant is lime stone dust.

5. An aid according to claim 2, which includes in the mixture an anti-oxidant and a fungicide.

6. An aid according to claim 5, wherein the anti-oxidant is a heterocyclic compound.

7. An aid according to claim 2, which includes in the mixture a sorbitan mono-oleat as an emulsifier.

8. An aid according to claim 2, which includes at least one suspension agent in the mixture.

9. An aid according to claim 8, wherein the suspension agent comprises an alginic acid salt and a cellulose derivative.

10. An aid according to claim 2, which includes a colouring agent in the mixture.

11. A composition to claim 1, which comprises

| | |
|---|---|
| limestone dust as the adjuvant | 51–60% (by mass) |
| micronized graphite as the weld spatter adhesion inhibitor | 5–6% (by mass) |
| soft water | 34–38% (by mass) |
| morpholine as an anti-oxidant | 0.5–1% (by mass) |
| polyoxethylene (20) sorbitan mono-oleat as an emulsifier | 0.2–0.4% (by mass) |
| potassium alginate as a suspension agent | 0.02–1% (by mass) |
| NATRASOL (trade name) as a further suspension agent | 0.01–2.1% (by mass) |
| KELZAN (trade name) as a still further suspension agent | 0.01–1.0% (by mass). |

12. A method of inhibiting adhesion of weld spatters to a metal surface, said method including the steps of:
    providing a welding aid consisting of:
        a particulate carbon-based weld spatter adhesion inhibitor;
        a particulate calcium-based adjuvant mixed with the inhibitor; and
        a liquid carrier for the adhesion inhibitor and the adjuvant,
    applying the welding aid to the metal surface; and
    welding the metal surface, during which the applied welding aid inhibits adhesion of weld spatters to the metal surface.

13. A method according to claim 12, including the steps of brushing the welding aid onto the metal surface.

* * * * *